July 31, 1945.  E. G. PANKOW  2,380,545

WATER HEATING APPARATUS

Filed Feb. 23, 1943

WITNESSES:

INVENTOR
EDMUND G. PANKOW.
BY
ATTORNEY

Patented July 31, 1945

2,380,545

UNITED STATES PATENT OFFICE 2,380,545

WATER HEATING APPARATUS

Edmund G. Pankow, Mansfield, Ohio, assignor to Westinghouse Electric Corporation, East Pittsburgh, Pa., a corporation of Pennsylvania Application February 23, 1943, Serial No. 476,829

8 Claims. (Cl. 219—38)

My invention relates to apparatus for heating water and has for an object to provide improved apparatus of this kind.

A further object of my invention is to rapidly heat a portion of the water in a tank to a relatively high temperature when the heating cycle is initiated with a body of water in the tank or after a large quantity of heated water is withdrawn from the tank.

It is a further object of my invention to provide improved thermostatically-controlled heating means for a heater for tap water or the like, wherein the temperature of the water is normally maintained at a predetermined mean value and wherein a small quantity of water heated to a temperature higher than said predetermined value is rapidly provided for use subsequent to the withdrawal of substantially all of the hot water from the tank or when heating is initiated with a cold body of water in the tank.

Figure 1:
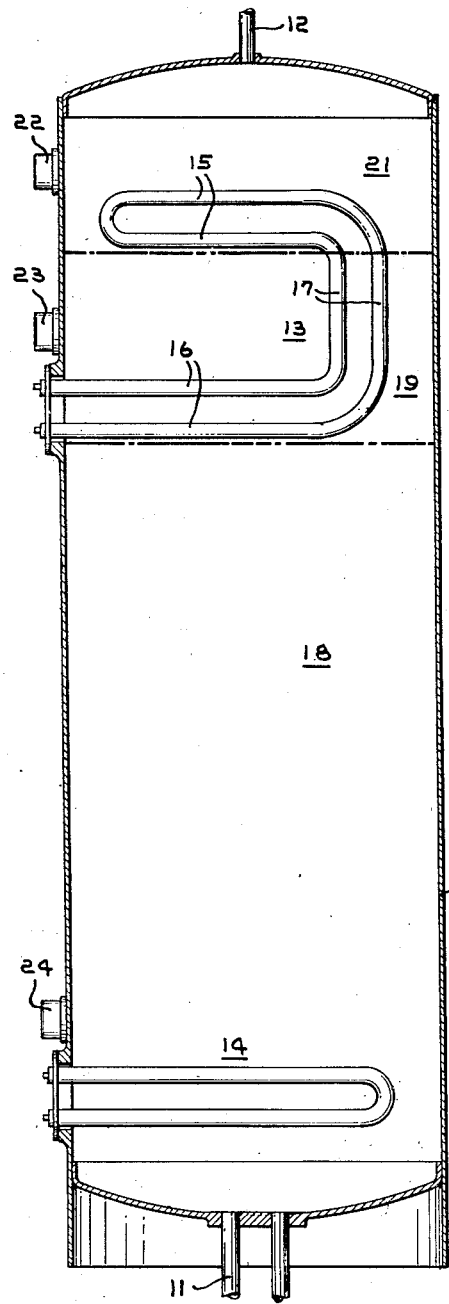
Figure 2:
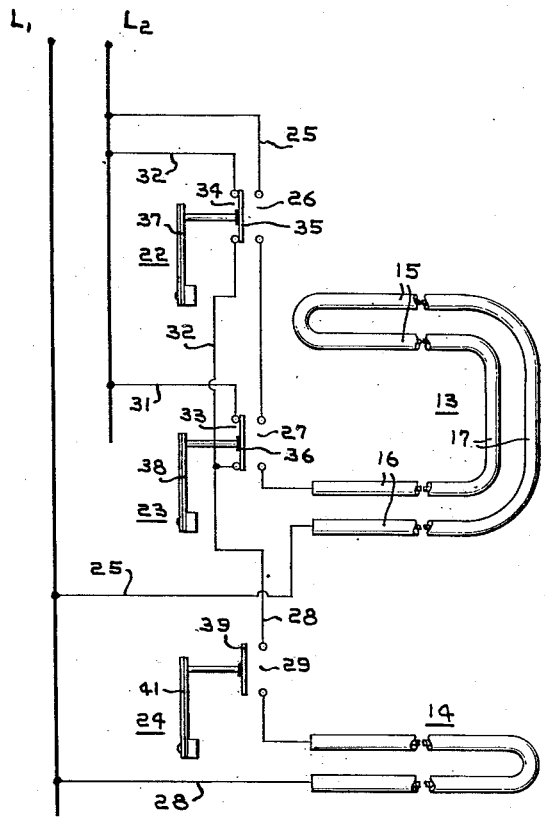

These and other objects are effected by my invention as will be apparent from the following description and claims taken in connection with the accompanying drawing, forming a part of this application, in which:

Fig. 1 is a vertical section taken through a tap water heater constructed and controlled in accordance with my invention; and Fig. 2 is a diagram of the electrical connections of the apparatus shown in Fig. 1.

Reference will now be had to Fig. 1 of the drawing wherein I have shown my invention applied to a liquid heater of the type usually employed for electrically heating water in residences or the like. The heater includes a generally cylindrical and vertical tank 10, having an inlet 11 for water to be heated and an outlet 12 for the heated water. The tank is provided with electric heating elements 13 and 14 disposed, respectively, in upper and lower regions of the tank. The heating elements 13 and 14 may be of any well-known construction but preferably are of the tubular type in which a heating coil is enclosed by and insulated from a metallic tubular casing. The heating element 14, which is of conventional construction, is arranged generally horizontally within the tank 10 so that all of the water in the tank above the element 14 is uniformly heated thereby when the element 14 is energized.

In accordance with my invention, the upper heating element 13 is formed so that it includes upper and lower heating portions 15 and 16 which extend generally horizontally within the tank and which are joined by a vertically-extending portion 17. When the upper heating element 13 is energized, the portion 16 of this element imparts heat uniformly to all of the water thereabove. The heated water rising from the portion 16 of the heating element 13 adjacent the vertically-extending portion 17 is further heated. The additional heat imparted to the water by the vertically-extending portion 17 of the heater 13 tends to stratify hot water adjacent the top of the tank. The portion 15 of the heating element 13 operates to uniformly heat all of the water thereabove.

Accordingly, three different temperatures of the water may obtain within the tank 10 during periods when the heater 13 is energized. The water in the lower region of the tank, indicated by the numeral 18, may be at one temperature depending upon the amount of heat imparted to the water in the region 18 by the heating element 14. The water in the zone indicated at 19 will be at a higher temperature because of the additional heat imparted to the water in this zone by the portion 16 of the heating element 13. The water in the upper zone, indicated at 21, will be at a still higher temperature because of the added heat imparted to this water by the portion 15 of the upper element 13. The temperature of the water in the upper zone 21 will also be elevated because of the heated water rising from the vertically-extending portion 17 of the element 13. The water in each of the zones 19 and 21 may constitute one-eighth of the total water in the tank while the amount of water in the region 18 would constitute approximately three-fourths of the total water of the tank.

Energization of the heating elements 13 and 14 is controlled by thermostats, generally indicated at 22, 23, and 24. The thermostats 22 and 23 are responsive to the temperature of the water prevailing in the zones 21 and 19, respectively, and the thermostat 24 responds to the temperature of the water in the lower region 18 of the tank.

Reference will now be had to Fig. 2 for a showing of the electrical connections between the heating elements and the thermostats. The wiring system which I have shown in Fig. 2 permits the energization of only one of the heating elements at a time, so that the load on the source of electric power is limited to the capacity of one of the elements. In this connection, however, my invention is equally applicable to a system wherein both of the elements may be energized simultaneously.

The source of power for the elements 13 and 14 is represented by the line conductors $L_1$ and $L_2$, which are energized at a suitable voltage of, for example, 230 volts. The upper heating element 13 is energized by a circuit 25 having switches 26 and 27 connected in series therein. The heating element 14 is energized by means of a circuit 28, controlled by a switch 29, which circuit 28 includes parallel branch conductors 31 and 32. The branches 31 and 32 are controlled by respective switches 33 and 34. The switches 26 and 34 are alternately closed by a bridging member 35 which is common to both switches.

Likewise, the switches 27 and 33 are closed by a bridging member 36 common to both switches. Bridging member 35 is actuated by a bimetal element 37 forming a part of the thermostat 22 and the bridging member 36 is actuated by a bimetal element 38 forming a part of the thermostat 23. The switch 29 includes a bridging member 39, actuated by a bimetal element 41 which defines a portion of the thermostat 24.

The thermostatic elements 37 and 38 are similar in construction and, when heated, move their respective bridging members 35 and 36 to the left as viewed in Fig. 2, whereby the switches 26 and 27 are opened and the switches 33 and 34 are closed. Conversely, when cooled, the bimetal members 37 and 38 move their bridging members 35 and 36 to the right for closing the switches 26 and 27 and for opening the switches 33 and 34. The bimetal 41, when heated, moves the switch 29 to the open position and, when cooled, moves it to the closed position.

In the description of the operation of the apparatus which follows, it will be assumed that the thermostat 22 closes its switch 26 at 135° F. and opens the same at 145° F. The thermostat 23 will close its switch 27 at 125° F. and open the same at 135° F. The switch 29 of the thermostat 24 will be closed and opened at 125° F. and 135° F., respectively. Assuming that the tank 10 is entirely filled with a relatively cold body of water at a temperature of, for example, 80° F., all of the switches 26, 27 and 29 will be closed. Accordingly, the top element 13 will be energized by means of the circuit 25 and the bottom element will be deenergized, as both switches 33 and 34 are open at this time.

As described heretofore, the element 13 will heat the body of water in both of the zones 19 and 21, but the temperature of the water in zone 21 will rise more rapidly than the temperature in zone 19 as described. When the temperature of the water in zone 21 is heated to 145° F., the thermal-responsive element 37 opens the switch 26 for deenergizing the element 13, and closes the switch 34. Accordingly, the bottom element 14 is energized through the branch 32 of its circuit 28 and heat is imparted to the water in the tank uniformly by the element 14 as described.

The heating of the water in the zones 19 and 21 by the element 13 from a cold condition, as described, will effect the opening of the switch 26 rather than the switch 27 as the temperature in the zone 21 will rise to 145° before the temperature in the zone 19 has been elevated to 135°, or the opening temperature of the switch 27.

The heating of the water by the element 14 will be carried out over a period of time, depending upon the capacity of the element 14. During this time, some hot water may be drawn from the tank 10 so that the temperatures of the water in zones 21 and 19 will be depressed. If the temperature in zone 21 is depressed to 135°, the thermal-responsive element 37 will again close the switch 26 and open the switch 34. As the switch 27 is still closed, the upper element 13 will again be energized. The opening of the switch 34, of course, deenergizes the lower element 14. The water in zones 21 and 19 will again be heated by the element 13 until the temperature of the water in zone 21 is elevated to 145°, at which time the switch 26 will be opened by the thermal-responsive element 37. The closing of the switch 34 will again energize the heating element 14.

During the operation of the element 14, the temperature of the water in the zone 19 may be elevated to 135° before any withdrawal of water would cause the temperature of the water in zone 21 to drop to the 135° "cut-on" temperature of the switch 26. In this event, the thermal-responsive element 38 will open the switch 27 and close the switch 33. This operation is of no moment for the present, as the closing of switch 33 merely connects the branch 31 in parallel with the branch 32 and opening of the switch 27 has no effect as switch 26 is open. When the temperature of the water in the region 19 of the tank is elevated to 135°, the thermal-responsive element 41 opens the switch 29 and deenergizes the lower heater 14.

Assuming now that water is drawn from the tank, the hot water line moves upwardly and the temperature of the water in the zone 21 may be depressed below 135°, which would cause the thermal-responsive element 37 to close the switch 26. This operation will not energize the upper element at this time, because the switch 27 is open, it being understood that the water in the zone 19 is above 125°. The withdrawal of the water will, of course, cause operation of the thermal-responsive element 41 and the lower heating element 14 will function to heat the cold body of water admitted to the lower part of the tank.

During normal operation, or when small quantities of water are withdrawn from the tank, heating of the water is effected by the lower element 14 as the upper element will remain deenergized unless the temperature of the water in the zone 19 is depressed to a value below 125°. The withdrawal of a relatively large quantity of hot water will cause the hot water line to rise, and when the temperature of the water is depressed to 125° in zone 19, the closing of the switch 27 by the thermal-responsive element 38 will again energize the upper heater 13.

The heating of the water in the tank 10 is usually effected by the lower heater 14, once the entire body of water has been heated to its maximum temperature. When a large withdrawal of water is such that the top heater 13 is energized, the energization of this heater 13 will be initiated by the thermostat 23. Deenergization of the heater 13 will be effected at this time by thermostat 22.

From the foregoing description, it will be apparent that I have provided improved water heating means and control of apparatus therefor wherein a small quantity of water at relatively high temperature is rapidly provided if the withdrawal of hot water from the heater is excessive. During normal demands for hot water, the stored body is maintained at a lower temperature. This operation is effected by the novel construction of the upper element and the thermostatic control of this element. The function of this combination is similar to the function provided by two separate thermostatically-controlled upper elements without the disadvantage of providing two such elements.

While I have shown my invention in but one form, it will be obvious to those skilled in the art that it is not so limited, but is susceptible of various changes and modifications without departing from the spirit thereof, and I desire, therefore, that only such limitations shall be placed thereupon as are specifically set forth in the appended claims.

What I claim is:

1. In liquid heating apparatus, the combination of a tank for the liquid to be heated, means for heating the liquid including a heating element disposed in an upper region of the tank, said heating element having spaced-apart upper and lower portions extending generally horizontally in superimposed zones in the upper region of the tank, and means for controlling energization of said heating element.

2. In liquid heating apparatus, the combination of a tank, means for heating the liquid including spaced upper and lower heating elements in the tank, said upper heating element having upper and lower portions disposed in superimposed zones in the upper region of the tank, and thermostatic means responsive to the temperature of the liquid in both of said zones for controlling energization of the heating means.

3. In liquid heating apparatus, the combination of a tank, upper and lower heating elements disposed in upper and lower regions of the tank, said upper element having upper and lower portions disposed in superimposed zones in the upper region of the tank and thermostatic means for selectively energizing the upper and lower heating elements and including heat-responsive devices responsive, respectively, to the temperatures of the liquid in said superimposed zones.

4. In water heating apparatus, the combination of a tank, a heating element disposed in an upper region of the tank and including upper and lower portions for heating the water, whereby stratified layers of heated water are provided, the upper layer of which is hotter than the lower layer, first and second thermostatic devices responsive, respectively, to the temperatures of said upper and lower layers of heated water for controlling energization of said heating element, said heating element being energized by the thermostatic devices when both of the temperatures of the layers of water are below predetermined values and deenergized when at least one of the temperatures of the layers of water is above a predetermined value, and a second heating element disposed adjacent the bottom of the tank for imparting heat to the water.

5. In water heating apparatus, the combination of a tank, a heating element disposed in an upper region of the tank and including upper and lower portions for heating the water, whereby stratified layers of heated water are provided, the upper layer of which is hotter than the lower layer, first and second thermostatic devices responsive, respectively, to the temperatures of said upper and lower layers of heated water for controlling energization of said heating element, said heating element being energized by the thermostatic devices when both of the temperatures of the layers of water are below predetermined values and deenergized when the temperature of at least one of the layers of water is above a predetermined value, a second heating element for heating the water adjacent the bottom of the tank, thermostatic means responsive to the temperature of the water adjacent the bottom of the tank for controlling energization of the second heating element, and means actuated by said first and second thermostatic devices for rendering said thermostatic means ineffective to energize the second heating element during periods when the first and second thermostatic devices are active to energize the first-mentioned heating element.

6. In a water heater, the combination of a tank for water to be heated, first and second heating means disposed in respective upper and lower regions of the tank, said first heating means including an electric heating element having upper and lower heating portions, first and second switches connected in series with said heating element for controlling energization thereof, and first and second means responsive to the temperatures of the water adjacent said upper and lower heating portions, respectively, for actuating the first and second switches, said first temperature-responsive means being responsive to predetermined temperatures for actuating the first switch and said second temperature-responsive means being responsive to predetermined temperatures, lower than said first predetermined temperatures, for actuating the second switch.

7. In water heating apparatus, the combination of a tank, first and second electric heating elements arranged in upper and lower portions of the tank, respectively, first and second electric circuits for the respective heating elements, said first heating element having upper and lower portions, switching means arranged in said first circuit for controlling energization of the first heating element, first and second thermostatic devices responsive, respectively, to the temperatures of the water adjacent the upper and lower portions of the first heating element for controlling said switching means, the construction and arrangement being such that the first heating element is energized when the temperatures of the water adjacent both the upper and lower portions of the first heating element are below predetermined values, said first heating element being deenergized when the temperature of the water adjacent at least one of said upper and lower portions of the first heating element is above a predetermined value, a switch arranged in said second circuit for controlling energization of the second heating element, temperature-responsive means responding to the temperature of the water adjacent the second heating element for opening and closing the switch, and means actuated by the first and second thermostatic devices and connected in said second circuit for controlling energization of the second heating element, said controlling means being effective to deenergize the second heating element during periods when the switching means is rendered active by the first and second thermostatic devices to energize the first heating element.

8. In a water heater, the combination of a tank, first and second heating elements disposed in upper and lower regions of the tank, said upper heating element having upper and lower portions, first and second electric circuits for the respective first and second heating elements, said second circuit being branched, first and second thermostatic switching means responsive to temperatures of the water adjacent the upper and lower portions of the first heating element, respectively, said thermostatic switching means having respective switches connected in series in said first circuit and respective switches connected in parallel in the branches of the second circuit, said parallel-connected switches being opened as their respective series-connected switches are closed and vice versa, a thermostatic switch responsive to the temperature of the water adjacent the second heating element and connected in said second circuit in series with both branches thereof.

EDMUND G. PANKOW.